US011761708B2

(12) United States Patent
Dosen et al.

(10) Patent No.: US 11,761,708 B2
(45) Date of Patent: *Sep. 19, 2023

(54) TUBE STAY INSTALLATION ASSEMBLY (71) Applicant: L & M Radiator, Inc., Hibbing, MN (US)

(72) Inventors: Todd Gregory Dosen, Side Lake, MN (US); Aaron Patrick Morgan, Britt, MN (US); Robert Janezich, Hibbing, MN (US)

(73) Assignee: L & M Radiator, Inc., Hibbing, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,918

(22) Filed: Feb. 28, 2022

(65) Prior Publication Data
US 2022/0178618 A1  Jun. 9, 2022

Related U.S. Application Data

(63) Continuation of application No. 16/912,766, filed on Jun. 26, 2020, now Pat. No. 11,262,131.

(51) Int. Cl.
| | |
|---|---|
| *F28F 7/00* | (2006.01) |
| *F28D 1/03* | (2006.01) |
| *F28D 1/053* | (2006.01) |
| *F28F 3/04* | (2006.01) |
| *F28D 7/16* | (2006.01) |
| *F28D 7/00* | (2006.01) |

(52) U.S. Cl.
CPC ....... *F28D 1/0391* (2013.01); *F28D 1/05375* (2013.01); *F28F 3/042* (2013.01); *F28D 7/0041* (2013.01); *F28D 7/163* (2013.01)

(58) Field of Classification Search
CPC .. F28D 1/0391; F28D 1/05375; F28D 7/0041; F28D 7/163; F28F 3/042
USPC .......................................................... 165/76
See application file for complete search history.

(56) References Cited

U.S. PATENT DOCUMENTS

| | | |
|---|---|---|
| 3,768,314 A | 10/1973 | Metzler et al. |
| 5,336,130 A | 8/1994 | Ray |
| 5,519,932 A | 5/1996 | Kuze |
| 6,082,440 A | 7/2000 | Clemens et al. |
| 11,262,131 B2 * | 3/2022 | Dosen ................... F28F 9/0132 |

(Continued)

OTHER PUBLICATIONS

Oct. 6, 2021—(WO) International Search Report & Written Opinion—App. No. PCT/US2021/039345.

*Primary Examiner* — Davis D Hwu
(74) *Attorney, Agent, or Firm* — Banner & Witcoff, Ltd.

(57) ABSTRACT

A tube stay mounting assembly includes a press assembly having a housing and a top block configured to flatten fins on a first surface of a finned tube. A press arm is operable to move the top block vertically with respect to the housing. A bottom block is configured to flatten fins on a second surface of the finned tube when the press arm is rotated and moves the top block downwardly. A tube stay clamping assembly includes a clamping housing configured to receive a tube stay having a top, bottom, rear, and front walls, the tube stay being configured to receive a flattened portion of the finned tube. A clamping arm is connected by linking arms to a clamping block, the clamping block configured to engage and force the front wall into snap-fit engagement with the top wall of the tube stay.

20 Claims, 11 Drawing Sheets

(56) References Cited

U.S. PATENT DOCUMENTS

2004/0154453 A1 8/2004 Kobayashi
2019/0176209 A1 6/2019 Kajitani et al.

\* cited by examiner

TUBE STAY INSTALLATION ASSEMBLY

RELATED APPLICATIONS

The instant application is a continuation of U.S. patent application Ser. No. 16/912,766, titled "TUBE STAY INSTALLATION ASSEMBLY" filed Jun. 26, 2020, the disclosure of which is hereby incorporated by reference in its entirety.

FIELD

Aspects of this invention relate generally to an assembly for installing tube stays on a finned heat exchanger tube, and, in particular, to an assembly that flattens a portion of fins on a heat exchanger tube and installs a tube stay on the flattened portion.

BACKGROUND

Heat exchanger cores may contain a plurality of finned tubes through which heated liquid to be cooled passes through. When such finned tubes are long, they may sway within the frame of the heat exchanger core and sometimes engage one another. Tube stays may be installed on the finned tubes to provide support for the tubes along their length, and help prevent the fins on each tube from contacting or engaging fins on adjacent tubes or contacting the framework.

It would be desirable to provide an assembly and method for easily installing tube stays on finned tubes of a heat exchanger core. Particular objects and advantages will be apparent to those skilled in the art, that is, those who are knowledgeable or experienced in this field of technology, in view of the following disclosure of the invention and detailed description of certain embodiments.

SUMMARY

Aspects of the present invention may be used to advantageously provide an assembly for installing a tube stay on a finned tube of a heat exchanger core, and method of installing such a stay.

In accordance with a first aspect, a tube stay mounting assembly includes a spacer strip extending along an alignment bar and configured to be received within a finned tube. A press assembly includes a housing having an opening through which the alignment bar extends. A top block is movably mounted to the housing and extends downwardly toward the alignment bar and is configured to flatten a first set of fins on a first surface of a portion of the finned tube. A press arm is rotatably mounted to the top block and is operable to move the top block vertically with respect to the housing. A bottom block extends upwardly from the alignment bar and is configured to flatten a second set of fins on an opposed second surface of a portion of the finned tube when the press arm is rotated and moves the top block downwardly. A tube stay clamping assembly includes a clamping housing having a recess configured to receive a stay having a top wall, a bottom wall, a rear wall, and a front wall pivotally connected to the bottom wall, the stay being configured to receive the portion of the finned tube. A clamping arm is connected by a pair of linking arms to a clamping block pivotally connected to the clamping housing, the clamping block being configured to engage and force the front wall into snap-fit engagement with the top wall of the stay when the clamping arm is rotated.

In accordance with another aspect, a tube stay mounting assembly includes a spacer strip extending along an alignment bar and configured to be received within a finned tube. A stop block is releasably secured to the alignment bar. A press assembly includes a housing through which the alignment bar extends. A top block is movably mounted to the housing and extends downwardly toward the alignment bar and is configured to flatten a first set of fins on a first surface of a portion of the finned tube. A press arm is rotatably mounted to the top block and is operable to move the top block vertically with respect to the housing. A bottom block extends upwardly from the alignment bar and is configured to flatten a second set of fins on an opposed second surface of a portion of the finned tube when the press arm is rotated and moves the top block downwardly. A tube stay clamping assembly includes a clamping housing having a recess configured to receive a stay having a top wall, a bottom wall, a rear wall, and a front wall pivotally connected to the bottom wall, the stay being configured to receive the portion of the finned tube. A clamping arm is connected by a pair of linking arms to a clamping block pivotally connected to the clamping housing, the clamping block being configured to engage and force the front wall into snap-fit engagement with the top wall of the stay when the clamping arm is rotated. A gauge assembly is configured to receive a flattened portion of the finned tube to determine if the stay can receive the flattened portion.

In accordance with further aspects, a tube stay mounting assembly includes a spacer strip extending along an alignment bar and configured to be received within a finned tube. A stop block is releasably secured to the alignment bar. A press assembly includes a housing having an opening through which the alignment bar extends. A top block is movably mounted to the housing and extends downwardly toward the alignment bar and is configured to compress a plurality of fins on a first surface of a portion of the finned tube. An arm is rotatably mounted to the top block and is operable to move the top block vertically with respect to the housing. A stop restricts downward movement of the top block. A bottom block extends upwardly from the alignment bar and is configured to compress a plurality of fins on an opposed second surface of a portion of the finned tube when the arm is rotated and moves the top block downwardly. A tube stay clamping assembly includes a clamping housing having a throat configured to receive a stay having a top wall, a bottom wall, a rear wall, and a front wall pivotally connected to the bottom wall, the stay being configured to receive the portion of the finned tube. A clamping arm is connected by a pair of link arms to a rotatable block, the rotatable block being configured to engage and force the front wall into snap-fit engagement with the top wall of the stay. A gauge assembly includes a first plate, a second plate spaced vertically above the first plate and defining a first slot between the first and second plates having a first height, and a third plate spaced vertically above the second plate and defining a second slot between the second and third plates having a second height that is less than the first height.

In accordance with other aspects, a method of installing a stay on a finned heat exchanger tube includes positioning a spacer strip within a tube portion of a finned tube; inserting the spacer strip into a first open end of the finned tube; passing the finned heat exchanger tube through an opening of a housing of a press assembly and along an alignment bar extending through the opening, the press assembly including a bottom block extending upwardly from the alignment bar, a top block movably mounted to the housing and extending downwardly toward the alignment bar, and a press arm rotatably mounted to the top block; rotating the press arm to move the top block downwardly such that the top block compresses a plurality of fins on a first surface of a portion of the finned tube and a plurality of fins on an opposed second surface of the portion of the finned tube to form a flattened portion of the finned tube; positioning a stay having a top wall, a bottom wall, a rear wall, and a front wall pivotally connected to the bottom wall in a throat of a clamping housing of a tube stay clamping assembly, the tube stay clamping assembly including a clamping arm connected by a pair of link arms to a block pivotally connected to the housing; positioning the flattened portion of the finned tube in the stay; and moving the clamping arm such that the block engages and force the front wall into snap-fit engagement with the top wall of the stay.

From the foregoing disclosure, it will be readily apparent to those skilled in the art, that is, those who are knowledgeable or experienced in this area of technology, that preferred embodiments of an assembly for installing a stay on a finned tube of a heat exchanger core may provide a significant technological advance in terms of improved installation of the stay. These and additional features and advantages will be further understood from the following detailed disclosure of certain preferred embodiments.

The figures referred to above are not drawn necessarily to scale and should be understood to provide a representation of the invention, illustrative of the principles involved. Some features of the tube stay installation assembly depicted in the drawings have been enlarged or distorted relative to others to facilitate explanation and understanding. The same reference numbers are used in the drawings for similar or identical components and features shown in various alternative embodiments. Tube stay installation assemblies as disclosed herein would have configurations and components determined, in part, by the intended application and environment in which they are used.

DETAILED DESCRIPTION OF CERTAIN PREFERRED EMBODIMENTS

Figure 1:
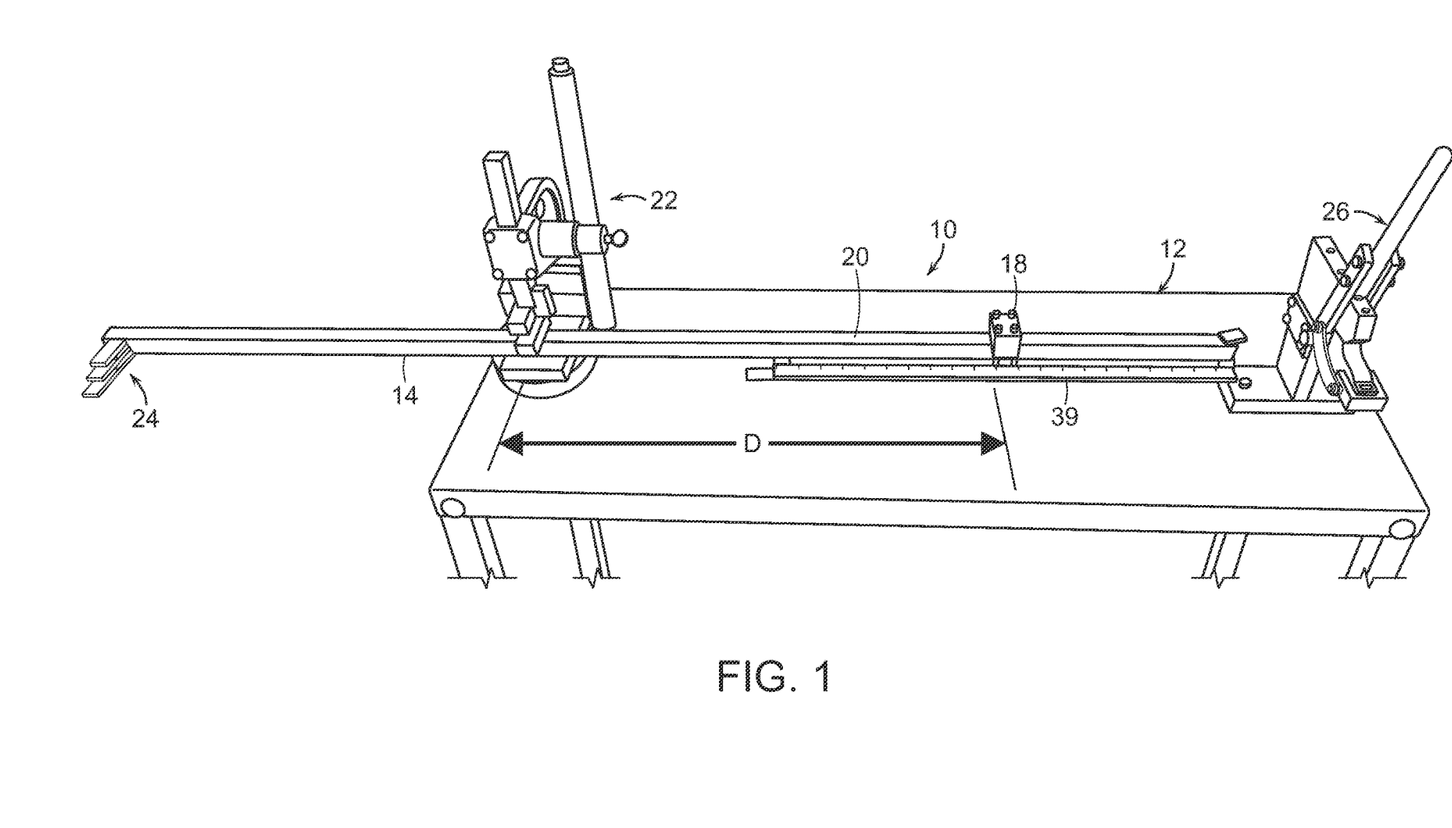
FIG. 1 is a perspective view of a tube stay installation assembly mounted on a table.

The present invention may be embodied in various forms. An embodiment of a tube stay installation assembly 10 is shown in FIG. 1. In the illustrated embodiment, components of tube stay installation assembly 10 are mounted on top of a table 12. It is to be appreciated that the components of tube stay installation assembly 10 need not all be mounted to a single table 12, and that one or more components of tube stay installation assembly 10 could be positioned remotely from the remainder of tube stay installation assembly 10.

For convenience, the terms "upper" and "lower" and "top" and "bottom" are used herein to differentiate between the upper and lower ends of the tube stay installation assembly 10 and particular components of the assembly. It is to be appreciated that "upper" and "lower" and "top" and "bottom" are used only for ease of description and understanding and that they are not intended to limit the possible spatial orientations of the tube stay installation assembly or its components during assembly or use.

The term "substantially", as used herein, is meant to mean mostly, or almost the same as, within the constraints of sensible commercial engineering objectives, costs, manufacturing tolerances, and capabilities in the field of tube stay installation. Similarly, the term "approximately" as used herein is meant to mean close to, or about a particular value, within the constraints of sensible commercial engineering objectives, costs, manufacturing tolerances, and capabilities in the field of tube stay installation.

Figure 2:
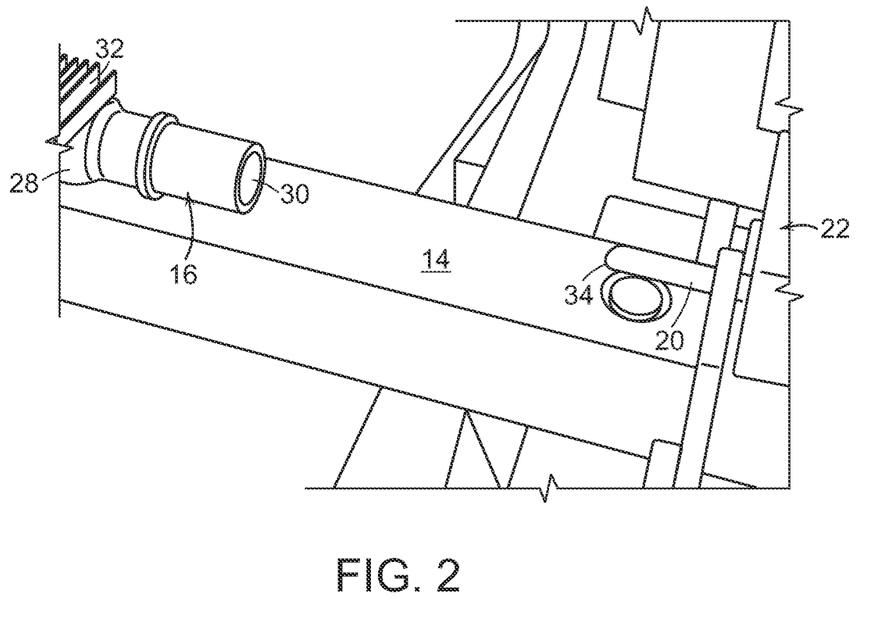
FIG. 2 is a perspective view of a finned tube prior to being passed through a press assembly of the tube stay installation assembly of FIG. 1.
Figure 3:
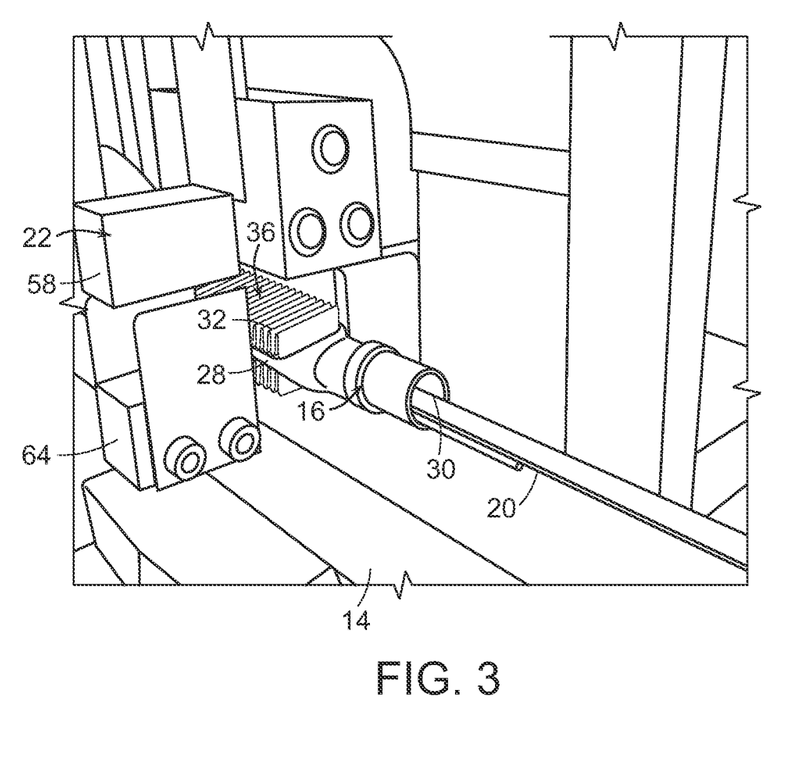
FIG. 3 is a is a perspective view of a finned tube passing through a press assembly of the tube stay installation assembly of FIG. 1.
Figure 4:
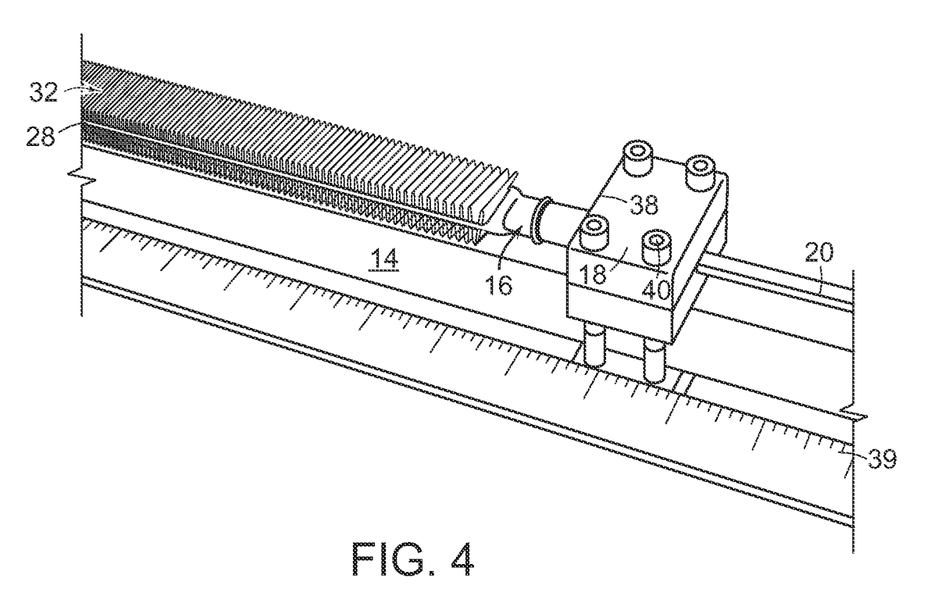
FIG. 4 is a perspective view of a finned tube being positioned adjacent a stop block of the tube stay installation assembly of FIG. 1.

Tube stay installation assembly 10 may include an alignment bar 14 upon which a finned heat exchanger tube or finned tube 16, seen in FIGS. 2-4, may be seated during installation of a tube stay on finned tube 16. A stop block 18 may be removably secured to alignment bar 14, and may be used to properly position finned tube 16 along alignment bar 14. A spacer strip 20 may extend along alignment bar 14, and may be received in finned tube 16 during at least portion of the installation of a stay 21 (seen in FIGS. 11-14 below) on finned tube 16, as seen in FIG. 2-4.

A press assembly 22 may be positioned along alignment bar 14 and may serve to flatten fins on finned tube 16, as described in greater detail below. A gauge assembly 24 may be secured to alignment bar 14 and may serve to measure a flattened portion of the fins of finned tube 16. A tube stay clamping assembly 26 may be positioned on table 12 and may be configured to clamp a stay about the flattened portion of the fins of finned tube 16, as described in greater detail below.

Each of stop block 18, press assembly 22, gauge assembly 24, and tube stay clamping assembly 26 may be configured as a separate workstation at which a different stage in the installation of stay 21 on finned tube 16 may be performed. As noted above, each of these elements or workstations may be positioned on table 12, however, it is to be appreciated that one or more of the workstations may be located remotely from table 12 and may still be able to serve their intended function in the installation of stay 21 on finned tube 16.

As seen in FIGS. 2-4, finned tube 16 may include a tube portion 28 having a first open end 30 and a second open end (not shown), and a plurality of fins 32 secured to an exterior surface of tube portion 28. First open end 30 may be substantially cylindrical while tube portion 28 may be flatter with an oval or racetrack shape. To begin installation of stay 21 on finned tube 16, as seen in FIG. 2-3, a first end 34 of spacer strip 20 is inserted into first open end 30 of finned tube 16, and finned tube is then slid along alignment bar 14. Finned tube 16 is then passed along alignment bar 14 and through an opening 36 of press assembly 32, through which alignment bar 14 extends.

Finned tube 16 may be passed along alignment bar 14 until a selected portion of finned tube 16 is positioned at a center of press assembly 22 where a portion of fins 32 can be flattened in order to accommodate stay 21. In certain embodiments, as illustrated in FIGS. 1 and 4, stop block 18 may be moved along alignment bar 14 until a left edge 38 of stop block 18 is located at a desired distance D from a center of press assembly 22. As seen in FIG. 4, a scale 39 may be positioned along alignment bar 14, allowing the user to accurately measure the distance between left edge 38 of stop block 18 and the center of press assembly 22. In the illustrated embodiment scale 39 has measurements in inches, however, it is to be appreciated that any unit of measure may be used on scale 39.

Stop block 18 may then be secured to alignment bar 14 with one or more fasteners such as bolts 40. It is to be appreciated that any type of fastener may be used to releasably secure stop block 18 to alignment bar 14, and that other suitable fasteners will become readily apparent to those skilled in the art, given the benefit of this disclosure.

Once finned tube 16 is in proper position with respect to press assembly 22, a first set 42 of fins 32 on a top or first surface 44 of finned tube 16 and a second set 46 of fins 32 on a bottom or second surface 48 of finned tube 16 may be compressed or flattened by press assembly 22 to form a flattened portion 49 of finned tube 16.

Figure 5:
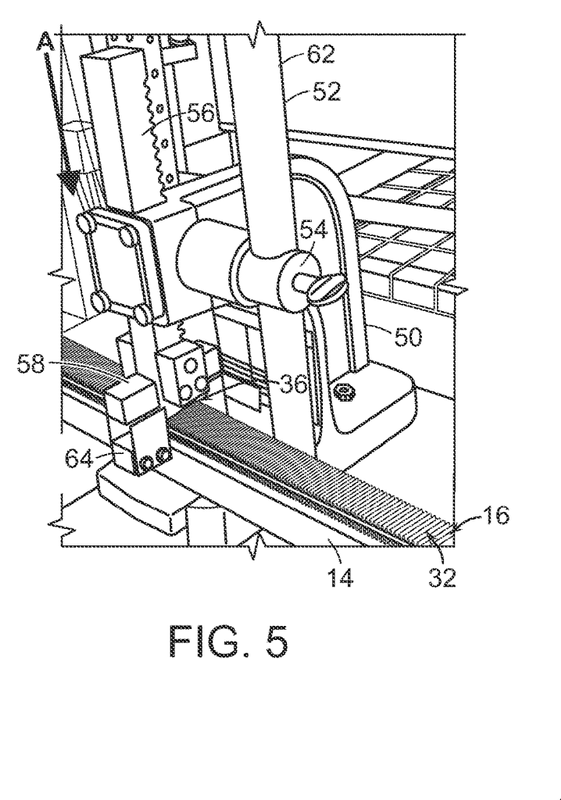
FIG. 5 is a perspective view of a press assembly of the tube stay installation assembly of FIG. 1, shown with a finned tube prior to compression of fins on the finned tube.
Figure 6:
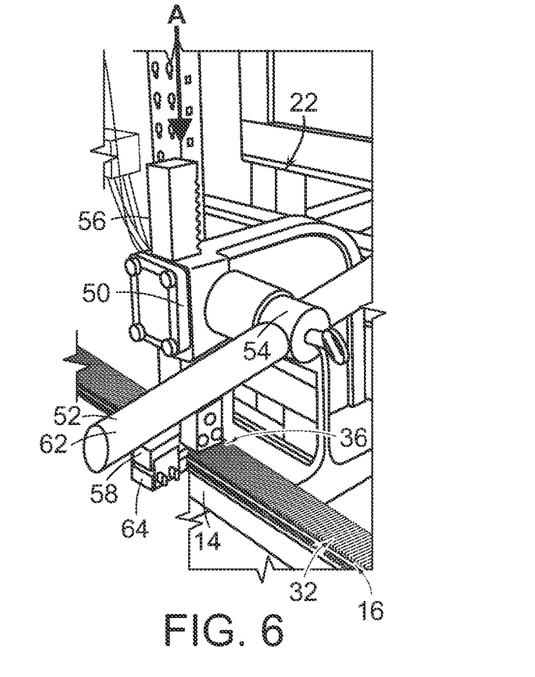
FIG. 6 is a perspective view of a press assembly of the tube stay installation assembly of FIG. 1, shown with a finned tube during flattening of fins on the finned tube.
Figure 7:
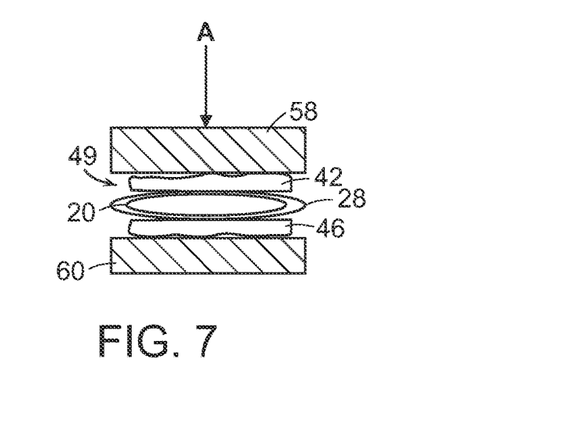
FIG. 7 is a section view of top and bottom blocks of a press assembly of the tube stay installation assembly of FIG. 1, shown after fins on the finned tube have been flattened by the blocks.

As seen in FIGS. 5-7, press assembly 22 may include a housing 50 defining opening 36. A handle 52 may be rotatably supported on housing 50 by a shaft 54. A pinion (not visible) at an end of shaft 54 engages a rack 56 such that rotation of handle 52 about shaft 54 causes rack 56 to move vertically. A top block 58 of press assembly 22 is mounted at a bottom of rack 56, and a bottom block 60 of press assembly is mounted to housing 50 beneath top block 58.

Figure 8:
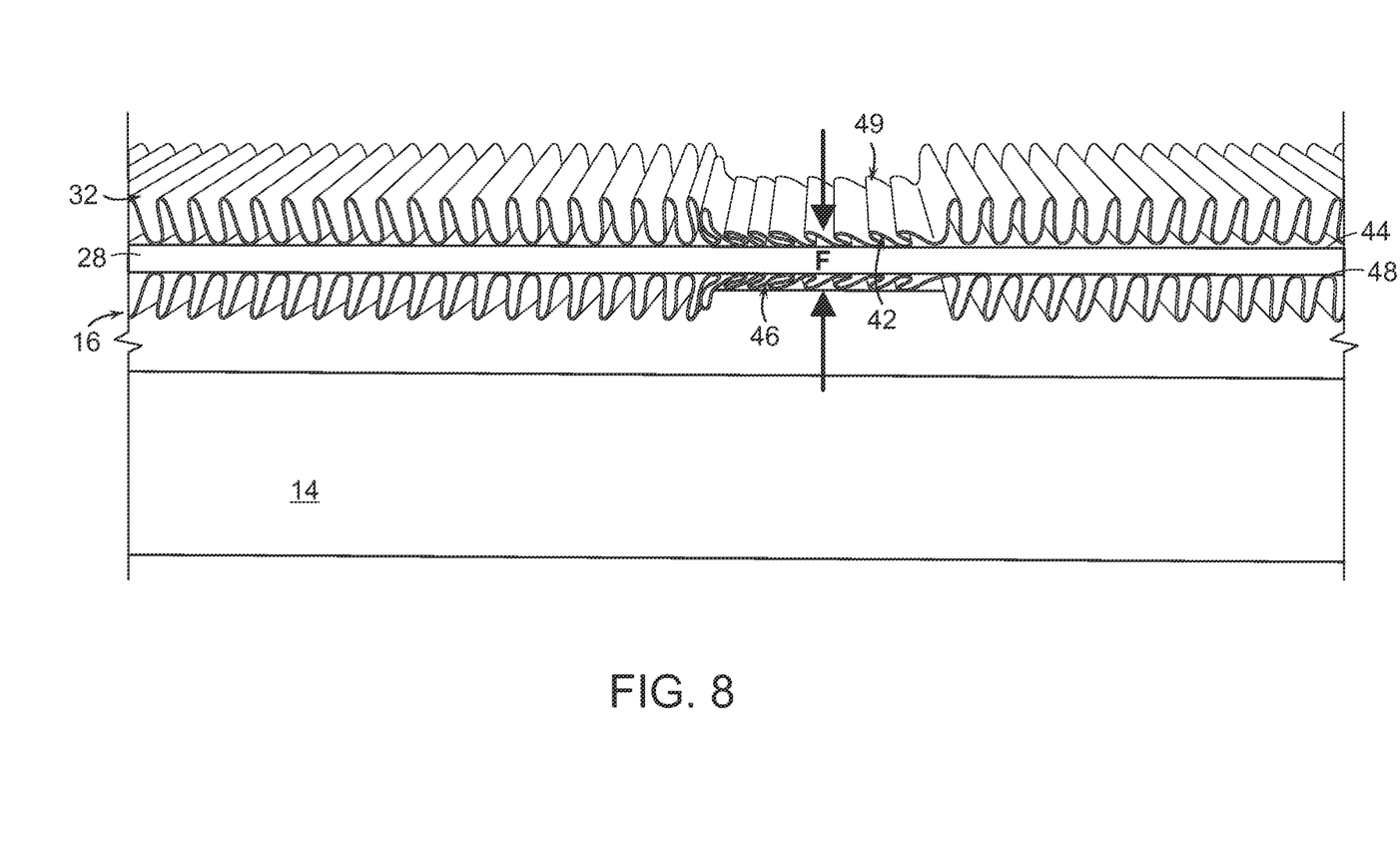
FIG. 8 is a perspective view of a finned tube after a portion of the tube has had its fins flattened by the press assembly of the tube stay installation assembly of FIG. 1.

As a user grasps a top portion 62 of handle 52 and rotates it forwardly about shaft 54, rack 56 moves downwardly, causing top block 60 to move downwardly in the direction of arrow A and compress or flatten first set 42 of fins 32. Simultaneously, as top block 60 presses downwardly on first set 42 of fins 32, second set 46 of fins 32 is forced downwardly and compressed or flattened by bottom block 62 to create flattened portion 49 of finned tube 16 having a height F. FIG. 8 illustrates finned tube 16 with first set 42 and second set 46 of fins 32 in a flattened condition.

A stop 64 may be mounted to housing 50, as illustrated in FIG. 5, and positioned to engage top block 58 and stop its downward movement at a desired position. The positioning of spacer strip 20 within tube portion 28 of finned tube 16 may help prevent tube portion 28 from being compressed and flattened as top block 60 moves downwardly.

Figure 9:
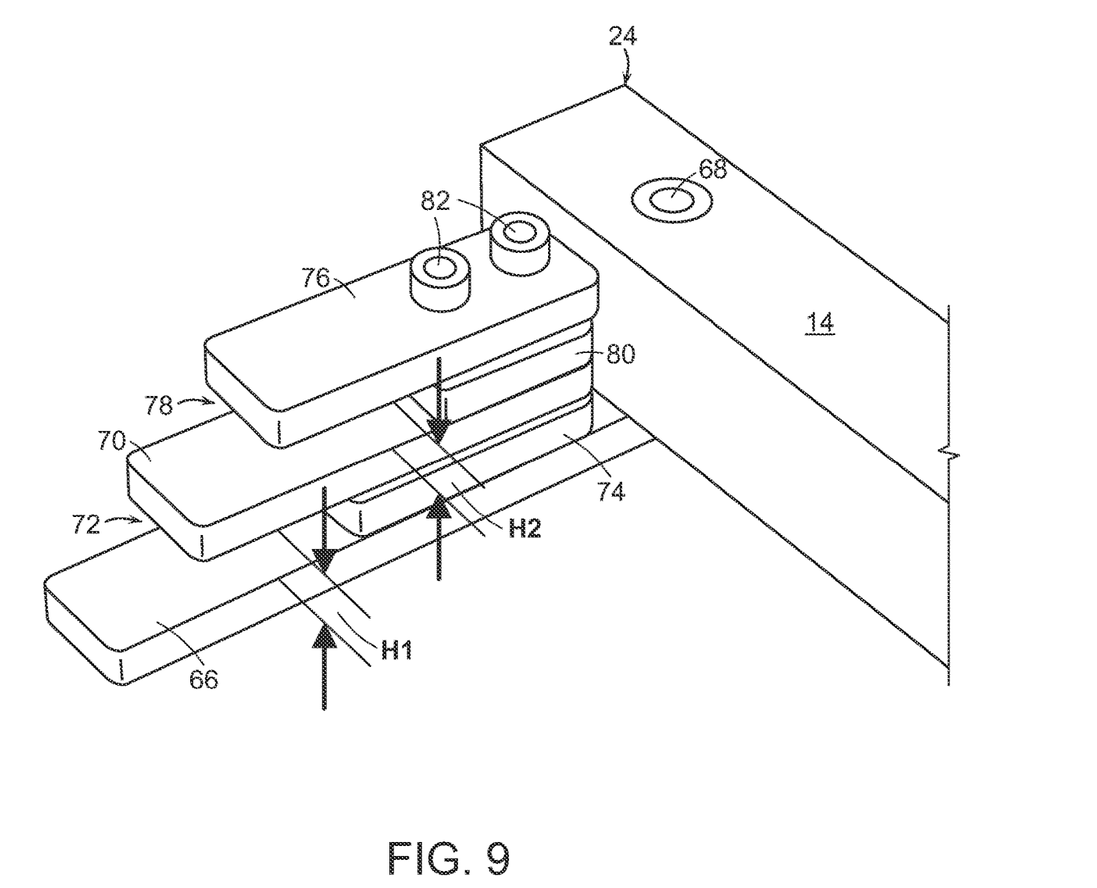
FIG. 9 is a perspective view of a gauge assembly of the tube stay installation assembly of FIG. 1.

As seen in FIG. 9, gauge assembly 24 may include a first plate 66, which may be secured to alignment bar 14 by way of a fastener such as a gauge bolt 68. It is to be appreciated that first plate 66 may be secured to alignment bar 14 by any type of fastener, and that other suitable fasteners will become readily apparent to those skilled in the art, given the benefit of this disclosure. Further it is to be appreciated that gauge assembly 24 need not be secured to alignment bar 14, and can be located at any desired position remote from alignment bar 14. A second plate 70 may be spaced vertically above first plate 66 defining a first gap 72 between first plate 66 and second plate 70 having a first height H1. A first spacer 74 may be positioned between first plate 66 and second plate 70. A third plate 76 may be spaced vertically above second plate 70 defining a second gap 78 between second plate 70 and third plate 76 having a second height H2 that is less than height H1. A second spacer 80 may be positioned between second plate 70 and third plate 76. First plate 66, first spacer 74, second plate 70, second spacer 80, and third plate 76 may all be secured to one another by one or more fasteners such as plate bolts 82. It is to be appreciated that first plate 66, first spacer 74, second plate 70, second spacer 80, and third plate 76 may be secured together by any type of fastener, and that other suitable fasteners will become readily apparent to those skilled in the art, given the benefit of this disclosure.

Figure 10:
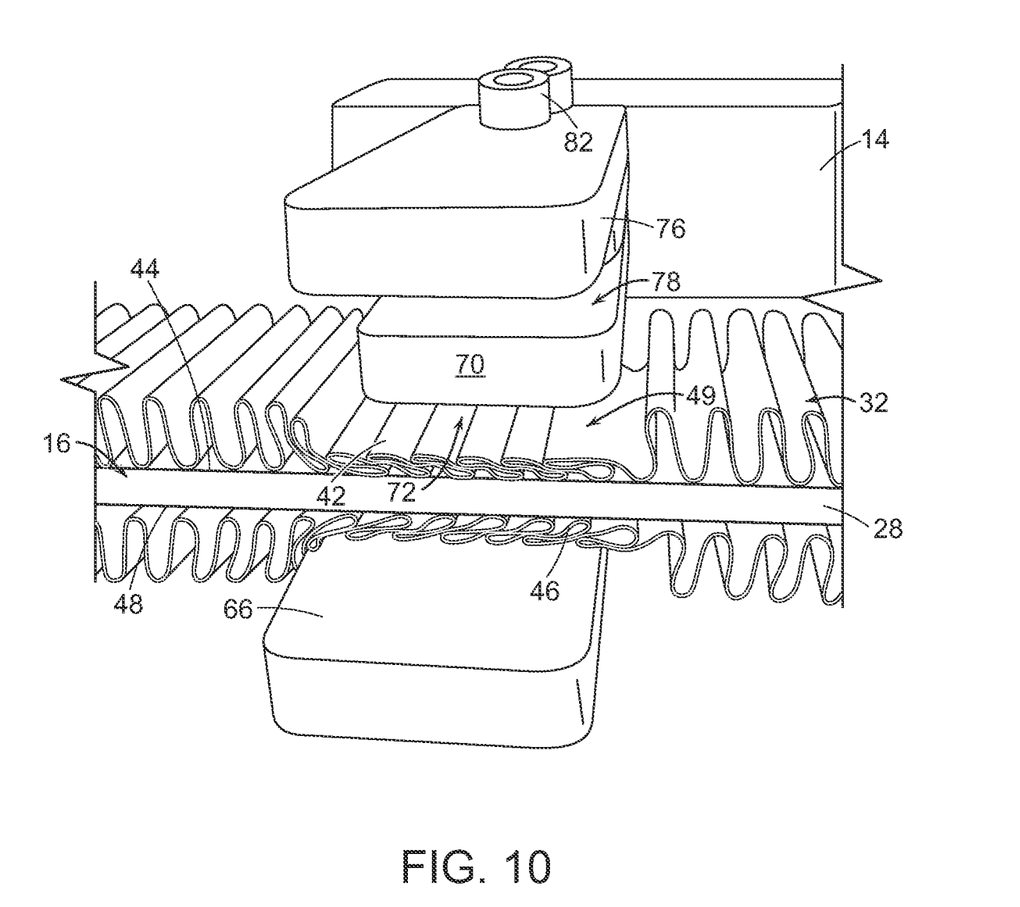
FIG. 10 is a front perspective view of the gauge assembly of FIG. 9, shown with a flattened portion of a finned tube inserted into a first gap of the gauge assembly.
Figure 11:
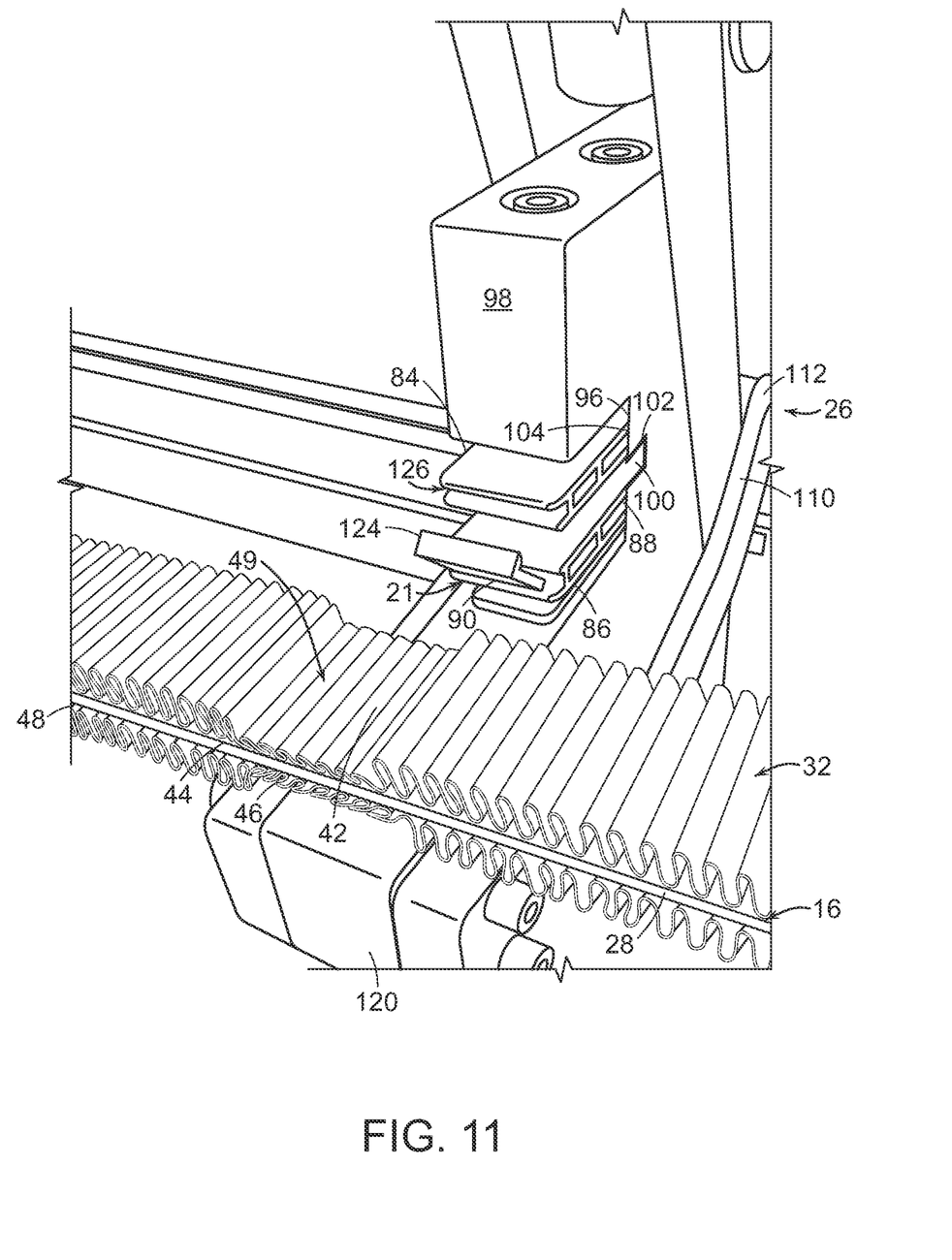
FIG. 11 is a perspective view of a tube stay clamping assembly of the tube stay installation assembly of FIG. 1, shown with a stay inserted into a recess in housing of the tube stay clamping assembly and a finned tube prior to its insertion into the stay.

Gauge assembly 24 may be used to determine if first set 42 and second set 46 of fins 32 have been flattened by an appropriate amount such that height F of flattened portion 49 is appropriately sized to receive stay 21. To use gauge assembly 24, as seen in FIG. 10, flattened portion 49 of finned tube 26 may be alternately inserted into each of first gap 72 and second gap 78. Height H1 of first gap 72 and height H2 of second gap 78 may be sized to ensure that flattened portion 49 is sized to accommodate stay 21. When height F of flattened portion 49 is small enough that flattened portion 49 can be slid into first gap 72, as illustrated in FIG. 10, but too large to be slid into second gap 78, the user can be assured that stay 21 will fit about flattened portion 49.

The installation of stay 21 on flattened portion 49 of finned tube 16 with tube stay clamping assembly 26 is illustrated in FIGS. 11-14. Stay 21 may include a top wall 84, a bottom wall 86, a rear wall 88, and a front wall 90 having a bottom edge 92 pivotally connected to bottom wall 86 and a free top edge 94. Initially, stay 21 may be seated in a recess 96 formed in a clamping housing 98 of tube stay clamping assembly 26. A projection 100 may be formed on rear wall 88 and may be received in a groove 102 formed in a rear surface 104 of recess 96 to help retain stay 21 within recess 96.

Tube stay clamping assembly 26 may include a clamping arm 106 pivotally connected by an arm shaft 108 to clamping housing 98. A pair of linking arms 110 may be pivotally connected at first ends 112 thereof to a first arm shaft 114 supported by clamping arm 106, and at second ends 116 thereof to a second arm shaft 118 supported by a clamping block 120. Clamping block 120 may be pivotally connected by a block shaft 122 to clamping housing 98.

Figure 12:
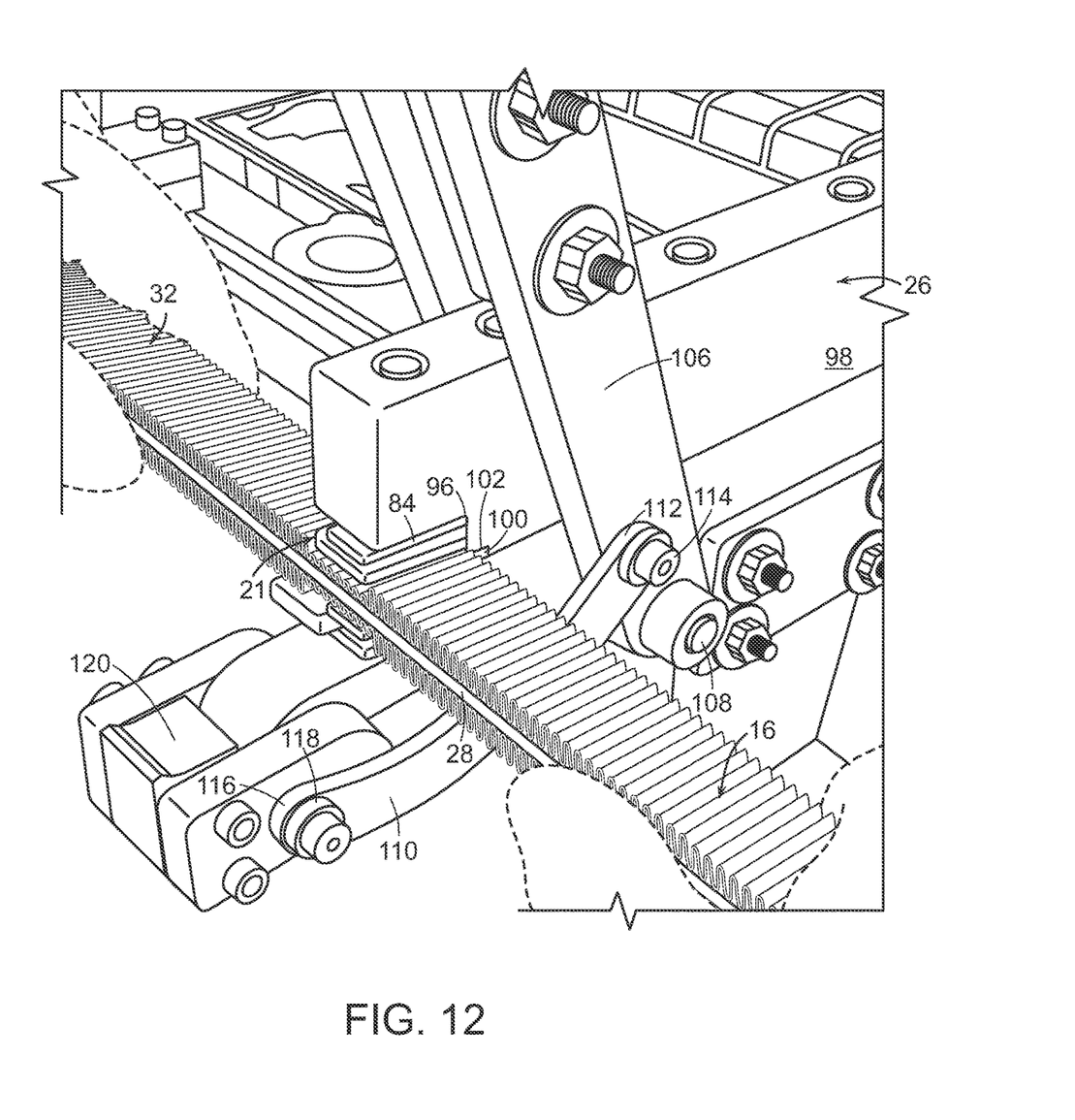
FIG. 12 is a perspective view of the tube stay clamping assembly of FIG. 11, shown with a flattened portion of a finned tube prior inserted into the stay.
Figure 13:
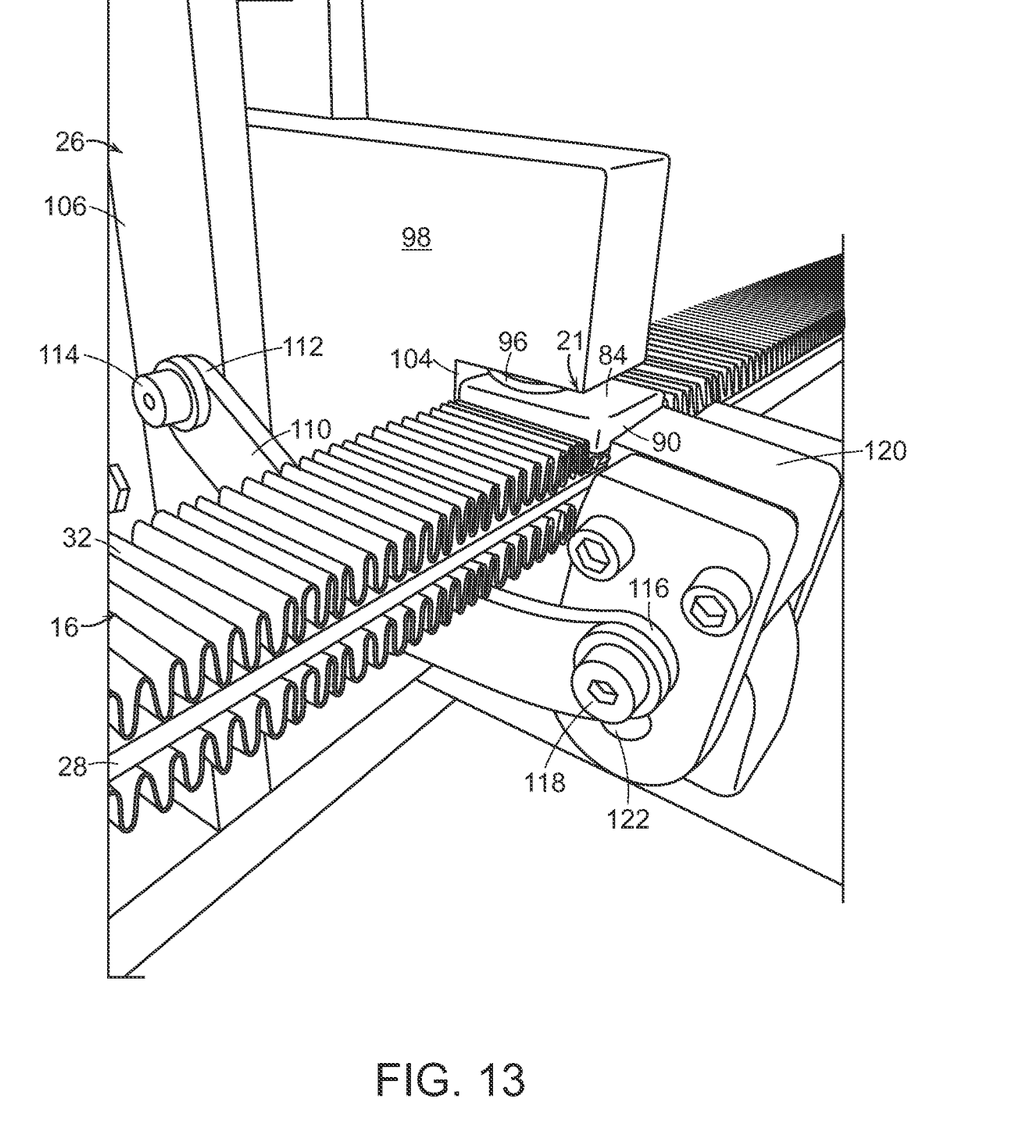
FIG. 13 is a perspective view of the tube stay clamping assembly of FIG. 11, shown with a clamping block engaging a front wall of the stay and forcing it into snap-fit engagement with a top wall of the stay.
Figure 14:
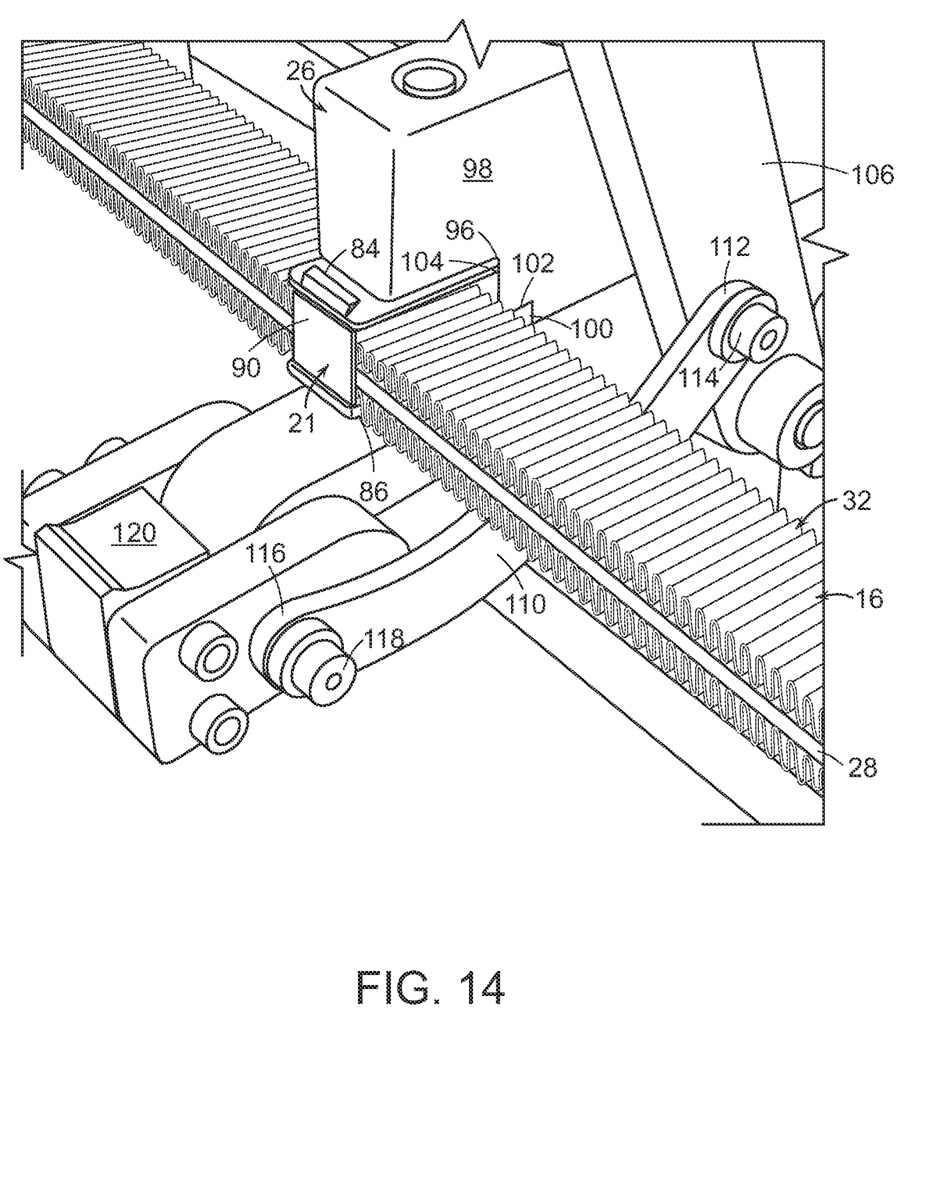
FIG. 14 is a perspective view of the tube stay clamping assembly of FIG. 11, shown with the stay engaged around a flattened portion of the finned tube.

To install stay 21 on finned tube 16, as illustrated in FIG. 12, flattened portion 49 of finned tube 16 is inserted into stay 21 between top wall 84 and bottom wall 86 with front wall angled forwardly away from bottom wall 86. When flattened portion 49 is properly seated within stay 21, clamping arm 106 may be rotated rearwardly about arm shaft 108, causing linking arms 110 to pull on clamping block 120 and pivot it rearwardly about block shaft 122. As clamping block 120 pivots rearwardly it engages front wall 90 of stay 21 and forces front wall rearwardly such that a lip 124 at free top edge 94 of front wall is forced into snap-fit engagement with a groove 126 formed in top wall 84 (seen in FIG. 11), thereby closing stay 21 about flattened portion 49 of finned tube 16.

In the illustrated embodiment, stay clamping assembly is seated on and mounted to table 12. It is to be appreciated that tube stay clamping assembly 24 need not be seated on or secured to table 12, and can be located at any desired position remote from table 12.

Various embodiments of a tube stay installation assembly have been described herein, which include various components and features. In other embodiments, the tube stay installation assembly may be provided with any combination of such components and features. It is also understood that in other embodiments, the various devices, components, and features of the tube stay installation assembly described herein may be constructed with similar structural and functional elements having different configurations, including different ornamental appearances.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above examples, but is encompassed by the following claims.

What is claimed is:

1. A tube stay mounting assembly comprising:
    a spacer strip configured to be received within a finned tube;
    a press assembly comprising:
        a housing;
        a top block movably mounted to the housing and configured to flatten a first set of fins on a first surface of a portion of the finned tube;
        a handle rotatably mounted to the top block and operable to move the top block vertically with respect to the housing; and
        a bottom block configured to flatten a second set of fins on an opposed second surface of a portion of the finned tube when the handle is rotated and moves the top block downwardly; and
    a tube stay clamping assembly comprising:
        a clamping housing configured to receive a stay having a top wall, a bottom wall, a rear wall, and a front wall pivotally connected to the bottom wall, the stay being configured to receive the portion of the finned tube; and
        a clamping arm connected to a clamping block that is pivotally connected to the clamping housing, the clamping block configured to engage and force the front wall into snap-fit engagement with the top wall of the stay when the clamping arm is rotated.

2. The tube stay mounting assembly of claim 1, further comprising a gauge assembly including a first plate, a second plate spaced vertically above the first plate and defining a first gap between the first and second plates having a first height, and a third plate spaced vertically above the second plate and defining a second gap between the second and third plates having a second height that is less than the first height.

3. The tube stay mounting assembly of claim 2, further comprising a first spacer positioned between the first plate and the second plate, and a second spacer positioned between the second plate and the third plate.

4. The tube stay mounting assembly of claim 1, further comprising:
    an alignment bar extending through the housing; and
    a stop block releasably secured to the alignment bar.

5. The tube stay mounting assembly of claim 4, further comprising a scale extending along the alignment bar.

6. The tube stay mounting assembly of claim 5, wherein the scale measures a distance along the alignment bar from a center of the press assembly.

7. The tube stay mounting assembly of claim 1, wherein the press assembly includes a stop to restrict downward movement of the top block.

8. The tube stay mounting assembly of claim 1, wherein the clamping arm is connected to the clamping block by a pair of linking arms.

9. The tube stay mounting assembly of claim 8, wherein the linking arms are pivotally connected at first ends thereof to the clamping arm by a first arm shaft and at second ends thereof to the clamping block by a second arm shaft.

10. The tube stay mounting assembly of claim 1, wherein the clamping block is pivotally connected to the clamping housing by a block shaft supported by the clamping housing.

11. The tube stay mounting assembly of claim 1, wherein the top block extends downwardly from the housing and the bottom block extends upwardly from the housing.

12. A tube stay mounting assembly comprising:
    a spacer strip extending along an alignment bar and configured to be received within a finned tube;
    a stop block releasably secured to the alignment bar; and
    a press assembly comprising:
        a housing through which the alignment bar extends;
        a top block configured to flatten a first set of fins on a first surface of a portion of the finned tube;
        a handle rotatably mounted to the top block and operable to move the top block vertically with respect to the housing; and
        a bottom block configured to flatten a second set of fins on an opposed second surface of a portion of the finned tube when the handle is rotated and moves the top block downwardly;
    a tube stay clamping assembly comprising:
        a clamping housing configured to receive a stay having a top wall, a bottom wall, a rear wall, and a front wall pivotally connected to the bottom wall, the stay being configured to receive the portion of the finned tube; and a clamping arm connected to a clamping block that is pivotally connected to the clamping housing, the clamping block configured to engage and force the front wall into snap-fit engagement with the top wall of the stay when the clamping arm is rotated; and a gauge assembly configured to receive a flattened portion of the finned tube to determine if the stay can receive the flattened portion.

13. The tube stay mounting assembly of claim 12, wherein the gauge assembly comprises a first plate, a second plate spaced vertically above the first plate and defining a first gap between the first and second plates having a first height, and a third plate spaced vertically above the second plate and defining a second gap between the second and third plates having a second height that is less than the first height.

14. The tube stay mounting assembly of claim 13, further comprising a first spacer positioned between the first plate and the second plate, and a second spacer positioned between the second plate and the third plate.

15. The tube stay mounting assembly of claim 12, further comprising a scale extending along the alignment bar.

16. The tube stay mounting assembly of claim 15, wherein the scale measures a distance along the alignment bar from a center of the press assembly.

17. The tube stay mounting assembly of claim 12, wherein the clamping arm is connected to the clamping block by a pair of linking arms.

18. The tube stay mounting assembly of claim 17, wherein the linking arms are pivotally connected at first ends thereof to the clamping arm by a first arm shaft and at second ends thereof to the clamping block by a second arm shaft.

19. The tube stay mounting assembly of claim 12, wherein the clamping block is pivotally connected to the clamp housing by a block shaft supported by the clamping housing.

20. The tube stay mounting assembly of claim 12, wherein the top block extends downwardly from the housing and the bottom block extends upwardly from the housing.

\* \* \* \* \*